US012146808B2

(12) United States Patent
Wilson et al.

(10) Patent No.: US 12,146,808 B2
(45) Date of Patent: Nov. 19, 2024

(54) OPTICAL ACOUSTIC SENSING SYSTEM AND METHOD

(71) Applicant: CMTE DEVELOPMENT LIMITED, Pinjarra Hills (AU)

(72) Inventors: Paul Wilson, Pinjarra Hills (AU); Timothy Brooks, Pinjarra Hills (AU); Long Giang, Pinjarra Hills (AU); Karsten Hoehn, Pinjarra Hills (AU); Michael Lofgren, Pinjarra Hills (AU)

(73) Assignee: CMTE DEVELOPMENT LIMITED, Pinjarra Hills (AU)

( * ) Notice: Subject to any disclaimer, the term of this patent is extended or adjusted under 35 U.S.C. 154(b) by 218 days.

(21) Appl. No.: 16/488,202

(22) PCT Filed: Feb. 22, 2018

(86) PCT No.: PCT/AU2018/050144
§ 371 (c)(1),
(2) Date: Aug. 22, 2019

(87) PCT Pub. No.: WO2018/152575
PCT Pub. Date: Aug. 30, 2018

(65) Prior Publication Data
US 2020/0064226 A1   Feb. 27, 2020

(30) Foreign Application Priority Data
Feb. 22, 2017   (AU) ................ 2017900583

(51) Int. Cl.
*G01M 13/045*   (2019.01)
*G01H 9/00*   (2006.01)

(52) U.S. Cl.
CPC .......... *G01M 13/045* (2013.01); *G01H 9/004* (2013.01)

(58) Field of Classification Search
CPC .. G01M 13/045; G01M 13/028; G01H 9/004; G01H 9/00; G01H 1/00; G01H 1/003
See application file for complete search history.

(56) References Cited

U.S. PATENT DOCUMENTS

| 5,365,787 A | 11/1994 | Hernandez |
| 6,389,887 B1 * | 5/2002 | Dusserre-Telmon ....................... G01M 13/028 73/114.77 |

(Continued)

FOREIGN PATENT DOCUMENTS

| DE | 102009025989 A1 | 12/2009 |
| WO | 2015042661 A2 | 4/2015 |

(Continued)

OTHER PUBLICATIONS

Yang, Fibre Optic Conveyor Monitoring System, The University of Queensland, 2014, (Year: 2014).*

(Continued)

*Primary Examiner* — Son T Le
*Assistant Examiner* — Matthew W. Baca
(74) *Attorney, Agent, or Firm* — Nixon Peabody LLP (57) ABSTRACT

A method of measuring the state or condition of spatially spaced apart machine parts subject to wear and emitting an acoustic signature. The method includes: (a) optically sensing the acoustic properties of the machine parts subject to wear, and deriving sensed signals there from, (b) dividing the sensed signals into a first series of corresponding spatial segments along the spaced apart machine parts and, for each spatial segment, dividing the sensed signal into a temporal segment recording the acoustic properties for the spatial segment over an extended time period; (c) dividing each temporal segment into a series of sub-segments and frequency domain transforming the sub-segments into corresponding frequency domain sub-segments; (d) combining (Continued)

the frequency domain sub-segments within a spatial segment, to produce a corresponding lower noise level combined frequency domain sub segment; and (e) determining the fundamental frequency of the emitted acoustic signatures present in the combined frequency domain sub segment, and associated harmonics.

22 Claims, 7 Drawing Sheets

(56) References Cited

U.S. PATENT DOCUMENTS

| | | | | |
|---|---|---|---|---|
| 2010/0038079 | A1* | 2/2010 | Greenaway | G01V 1/226 |
| | | | | 166/254.2 |
| 2010/0235115 | A1* | 9/2010 | Shepard | G01J 5/0896 |
| | | | | 702/179 |
| 2011/0285984 | A1* | 11/2011 | Christian | G01S 7/4812 |
| | | | | 356/28.5 |
| 2012/0057432 | A1* | 3/2012 | Hill | E21B 43/26 |
| | | | | 367/81 |
| 2014/0039809 | A1* | 2/2014 | Girondin | G01N 29/4463 |
| | | | | 702/39 |
| 2014/0088450 | A1* | 3/2014 | Mottaiyan | A61B 5/25 |
| | | | | 600/521 |
| 2015/0282777 | A1* | 10/2015 | Compas | A61B 6/504 |
| | | | | 600/431 |
| 2015/0363362 | A1* | 12/2015 | Menkhoff | H04L 27/361 |
| | | | | 708/290 |
| 2017/0167245 | A1* | 6/2017 | Dickenson | G01V 1/40 |
| 2019/0130994 | A1* | 5/2019 | Ruderman | G16B 40/10 |

FOREIGN PATENT DOCUMENTS

| | | | |
|---|---|---|---|
| WO | 2016027072 | A1 | 2/2016 |
| WO | 2016115591 | A1 | 7/2016 |
| WO | 2002095633 | A2 | 11/2018 |

OTHER PUBLICATIONS

Schmid, "How to us the FFT and Matlab's pwelch function for signal and noise simulations and measurements," (University of Applied Sciences Northwestern Switzerland School of Engineering, Aug. 2012) (Year: 2012).*

Yang, B. Y. et al. "Fibre Optic Conveyor Monitoring System", A Thesis Submitted for the Degree of master of Philosophy, School of Mechanical and Mining Engineering, The University of Queensland, 2014, XP055407477.

Bartlett, M. S., "Smoothing Periodograms from Time-Series with Continuous Spectra", Nature 161, 686-687 (1948) https://doi.org/10.1038/161686a0.

Welch, P. D. (1967), "The use of Fast Fourier Transform for the estimation of power spectra: A method based on time averaging over short, modified periodograms" (PDF), IEEE Transactions on Audio and Electroacoustics, AU-15 (2): 70-73, doi:10.1109/TAU.1967.1161901.

H. Schmid, "How to use the FFT and Matlab's pwelch function for signal and noise simulations and measurements," Institute of Microelectronics, University of Applied Sciences NW Switzerland, No. Aug. 2012.

Deshpande, L. G. "Simulation of Vibrations Caused by Faults in Bearings and Gears", A thesis in fulfilment of the requirements for the degree of Doctor of Philosophy, School of Mechanical and Manufacturing Engineering, The University of New South Wales.

Liu, Xin et al. "Distributed Fiber-Optic Sensors for Vibration Detection." Sensors (Basel, Switzerland) vol. 16,8 1164. Jul. 26, 2016, doi:10.3390/s16081164.

Extended European Search Report in European Patent Application No. EP 18757412.4, mailed Jan. 13, 2021 (11 pages).

Russian Office Action in Russian Patent Application No. RU 2019129589/11, mailed Jan. 18, 2021 (6 pages with English translation).

Alguindique, I. E. et al., "Monitoring and Diagnosis of Rolling Element Bearings Using Artificial Neural Networks," IEEE Transactions on Industrial Electronics, vol. 40, No. 2, pp. 209-216 (Apr. 1993).

Wilson, P. et al.; "Distributed Acoustic Conveyor Monitoring: Phase 1: Final Report"; Dec. 19, 2016; retrieved from https://www.acarp.com.au on Feb. 23, 2017 (74 pages).

International Search Report for International Patent Application No. PCT/AU2018/050144, mailed May 9, 2018 (4 pages).

Written Opinion of International Searching Authority for International Patent Application No. PCT/AU2018/050144, mailed May 9, 2018 (4 pages).

Letter dated Jul. 30, 2019, from A. Mabardi confirming that the final report for the C24014 Distributed Acoustic Conveyor Monitoring w, by P. Wilson et al., was downloaded on Feb. 23, 2017 (1 page).

* cited by examiner

First-order high pass filter as an analogue computer programme

Bearing parameters & frequencies

FTF = the frequency of rotation of the cage
BSF = the ball spin frequency
BPFO = the ball pass frequency of the outer race
BPFI = the ball pass frequency of the inner race $$FTF = \frac{S}{2} \cdot [1 - (\frac{Bd}{Pd} \cdot \cos\theta)]$$

$$BSF = \frac{Pd}{2Bd} \cdot S \cdot [1 - (\frac{Bd}{Pd} \cdot \cos\theta)^2]$$

$$BPFO = \frac{Nb}{2} \cdot S \cdot [1 - (\frac{Bd}{Pd} \cdot \cos\theta)]$$

$$BPFI = \frac{Nb}{2} \cdot S \cdot [1 + (\frac{Bd}{Pd} \cdot \cos\theta)]$$

S = bearing rotational velocity (R/sec)
Bd = ball diameter
Pd = centre of the cage diameter
Nb = number of balls in the race
$\theta$ = race shell contact angle in degrees

OPTICAL ACOUSTIC SENSING SYSTEM AND METHOD

CROSS-REFERENCE TO RELATED APPLICATIONS

This application is U.S. National Stage of International Application No. PCT/AU2018/050144, filed Feb. 22, 2018, which claims the benefit of and priority to Australia Patent Application No. AU 2017 900583, filed Feb. 22, 2017, all of which are incorporated herein by reference in their entireties.

FIELD OF THE INVENTION

The present invention provides for systems and methods for the distributed sensing of mechanical equipment and, in particular, the distributed optical sensing of rollers and bearings or moving parts and mechanisms, including those contained in conveyor belts.

BACKGROUND OF THE INVENTION

Any discussion of the background art throughout the specification should in no way be considered as an admission that such art is widely known or forms part of common general knowledge in the field.

The remote monitoring of equipment, such as rollers and bearings in conveyor belts is a significant problem in the mining and other industries. Conveyor belt maintenance can be expensive. For example, a 1 km length of conveyor belt might contain 6,700 bearings or more, the failure of any one of which can lead to catastrophic consequences, such as conveyor belt damage or fires. Rollers and bearings can fail in many ways, including casing failure, pizza cutter failures and bearing failures.

Previous methods at monitoring the state of rollers has included visual and auditory inspection by physically walking the conveyor belt and manually listening to the bearings, or for example, thermal imaging.

PCT publication WO 2005/042661 and PCT publication WO 2015/115591, the contents both of which are incorporated by cross reference, propose one form of conveyor belt idler bearing monitoring system which involves having wi-fi monitors within each bearing roller monitoring the bearing state. Such a solution is likely to be unduly expensive and prone to failure due to the large number of bearings and a large system requiring complex interactions.

The present invention has application to the monitoring of other equipment containing bearings and other moving parts such as motors, pumps, gearboxes, turbines, transmissions, crushing and grinding machinery and bulk materials handling equipment. The present invention also has application to monitoring other equipment in a distributed fashion using fibre optical acoustics.

SUMMARY OF THE INVENTION

It is an object of the invention, in its preferred form, to provide an improved form of equipment monitoring, including machine parts subject to wear.

In accordance with a first aspect of the present invention, there is provided a method of measuring the state or condition of a plurality of spatially spaced apart machine parts subject to wear and emitting an acoustic signature, the method including the steps of: (a) optically sensing the acoustic properties of the plurality of machine parts along their length, and deriving sensed signals there from, (b) dividing the sensed signals into a first series of corresponding spatial segments along the spaced apart bearings and, for each spatial segment, dividing the sensed signal into a temporal segment recording the acoustic properties for the spatial segment over an extended time period; (c) dividing each temporal segment into a series of sub-segments and frequency domain transforming the sub-segments into corresponding frequency domain sub-segments; (d) combining the frequency domain sub-segments within a spatial segment, to produce a corresponding lower noise level combined frequency domain sub segment; and (e) determining the fundamental frequency of the emitted acoustic signatures present in the combined frequency domain sub segment, and associated harmonics.

In some embodiments, the machine parts can include bearings, and, can form part of a conveyor belt. Preferably, the optical sensing occurs substantially simultaneously for the acoustic properties of the plurality of machine parts.

The step (d) further preferably can include, subtracting a noise floor measure from the combined frequency domain sub segment. The noise floor measure preferably can include an interpolated curve through substantially the lower noise floor levels of the combined frequency domain sub segment. The interpolated curve preferably can include one of a polynomial, exponential, logarithmic or piece wise curve.

The sensing step (a) can comprise optically sensing the acoustic properties of the bearings. The optical sensing preferably can include utilising the scattering along an optical fibre to sense the acoustic properties.

The step (a) further preferably can include filtering the sensed signals to account for frequency based attenuation characteristics of the sensing system.

The step (e) preferably can include the step of convolving a Gaussian or other suitable peaked shaped structure with the combined frequency domain sub segment.

In accordance with a further aspect of the present invention, there is provided a system for measuring the state or condition of a plurality of spatially spaced apart bearings, the system including: first sensor unit for optically sensing the acoustic properties surrounding an extended optical waveguide placed in proximity to the spaced apart bearings; processing means for processing the sensed signals into a series of corresponding spatial segments; with each spatial segment having an extended temporal segment, recording the acoustic properties of the spatial segment for an extended time period; the processing means further performing frequency domain processing of the extended temporal segment to produce corresponding lower noise level frequency domain segment; and the processing means further reviewing the frequency domain segment to determine the existence of any fundamental frequency and associated harmonics of any bearing emitting an acoustic signature.

In accordance with a further aspect of the present invention, there is provided a method of measuring the state or condition of a conveyor belt system, the conveyor belt system including a plurality of roller units, also known as idlers, each having a series of bearings in the rollers, the method including the steps of: (a) optically sensing the acoustic properties of the conveyor belt system along its length, and deriving sensed signals there from, (b) dividing the sensed signals into a first series of spatial segments along the conveyor belt and for each spatial segment, dividing the signal into a temporal segment recording the acoustic properties for the spatial segment over an extended time period; (c) optionally filtering the temporal segment to account for frequency based attenuation characteristics of the optical sensing system; (d) dividing each temporal segment into a series of sub-segments and frequency domain transforming the sub-segments into corresponding frequency domain sub-segments; (e) combining the frequency domain sub-segments within a spatial segment, to produce a corresponding lower noise level combined frequency domain sub segment; (f) determining the fundamental frequency of rotation of any rollers present in the combined frequency domain sub segment, and associated harmonics; and (g) determining frequency patterns indicative of different failure types.

In some embodiments, the method can further include the steps of: (g) subtracting a model of the fundamental frequency of rotation and harmonics from the combined frequency domain sub segment to obtain a modified frequency domain sub-segment; and (h) analysing the modified frequency domain sub-segment to determine bearing wear conditions.

The step (f) preferably can include cross correlating the combined frequency domain sub segment with a Gaussian or any other similar response function. The step (e) preferably can include averaging or summing frequency domain sub-segments. The step (e) preferably can include regressing the noise floor within the frequency domain sub segment using a polynomial, exponential, logarithmic or other piecewise linear or piecewise curve function, plus an algebraic summation or subtraction.

The bearing wear conditions can include at least one of: the fundamental frequency of rotation of rollers and harmonic frequencies; bearing spalling frequencies, if any, bearing midlife wear patterns, or bearing late stage wear patterns, bearing haystack patterns.

The temporal segments are preferably at about 5 to 30 minutes in length depending on the conveyor but may be shorter or longer. The sub-segments are preferably approximately 3 seconds long but vary depending on the conveyor. The spalling frequencies are preferably below 100 Hz.

BRIEF DESCRIPTION OF THE DRAWINGS

Embodiments of the invention will now be described, by way of example only, with reference to the accompanying drawings in which.

DETAILED DESCRIPTION

The embodiments provide for a system and method which utilises an optical acoustic monitoring system with complex back end processing to accurately monitor the condition of equipment along a conveyor belt.

Figure 1:
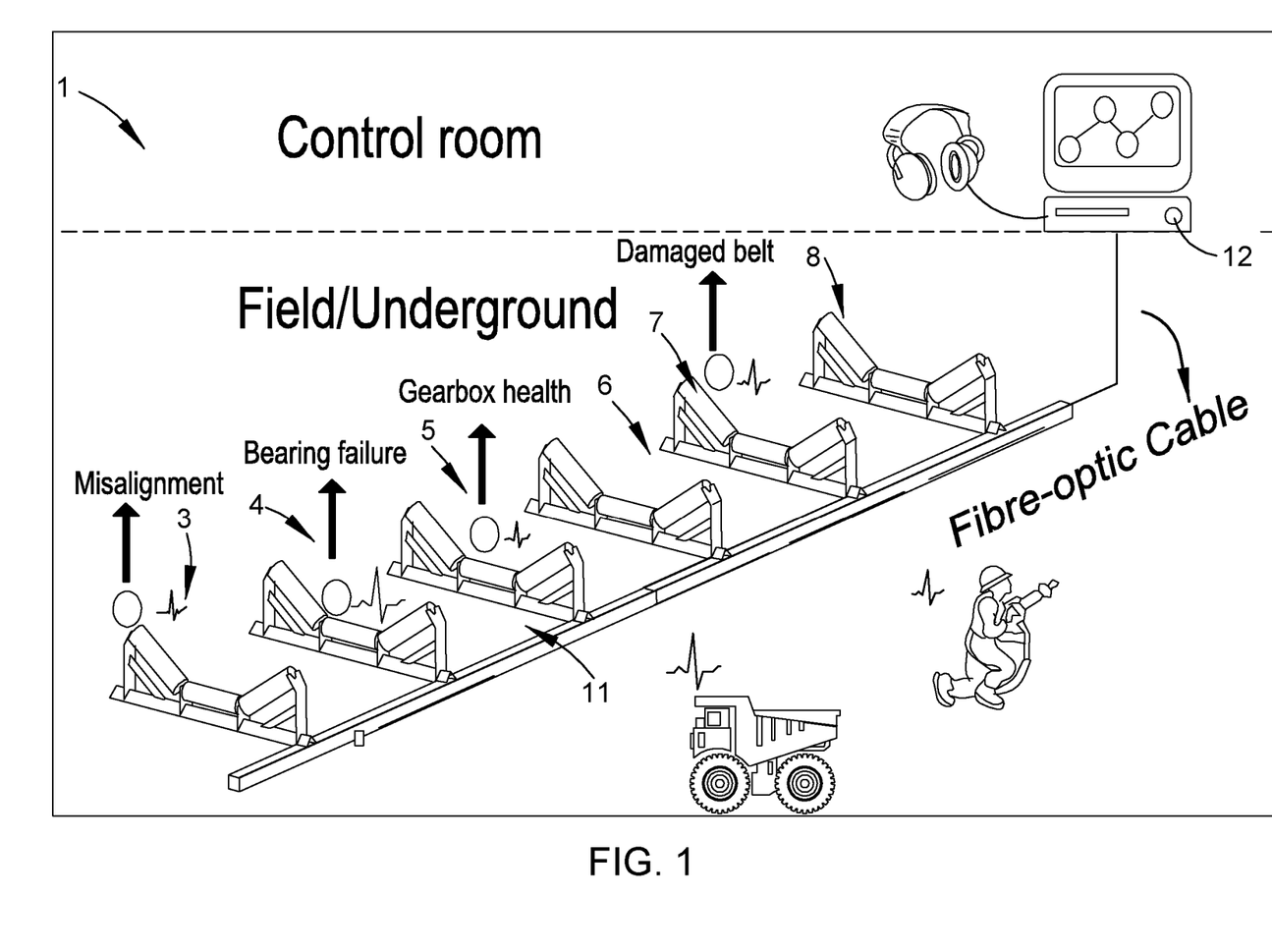
FIG. 1 illustrates schematically the optical sensing system of an embodiment.

Turning initially to FIG. 1, there is shown schematically the operational environment of an embodiment. In this arrangement 1, a series of rollers e.g. 3-8 are monitored by a single optical fibre cable 11 which is placed alongside the rollers. The optical fibre cable 11 includes an acoustic sensing environment and is connected to a series of enhanced processing units (or interrogators or optical monitoring system) 12 which process the acoustic signal to determine the state or health of each roller. In practical systems, many thousand sets of rollers may be effectively simultaneously monitored.

Through significant processing of the received optical signal, the state of the rollers and their bearings can be determined, in addition to the state of the conveyor belt.

Figure 2:
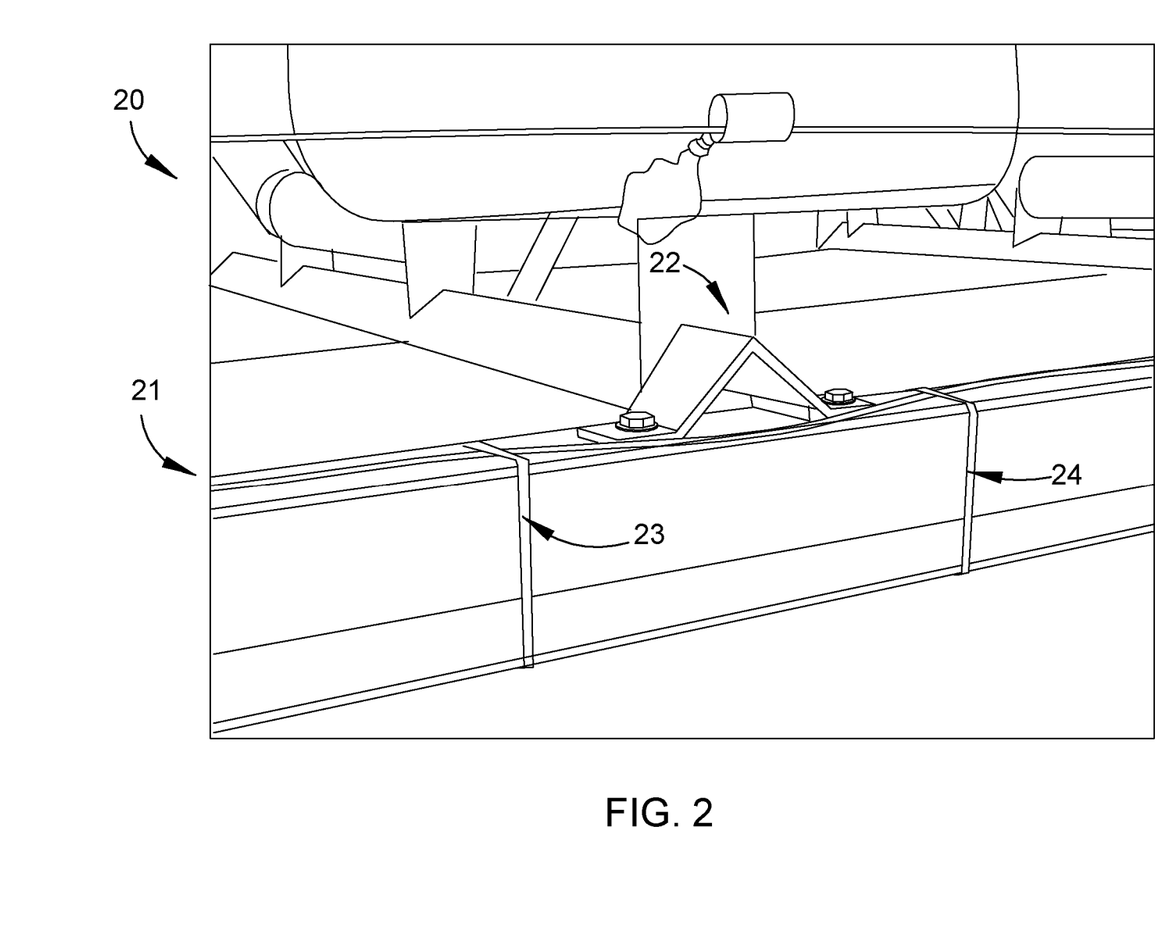
FIG. 2 illustrates a photograph of an example attachment of an optical fibre sensing cable to a conveyor belt system.

Examples of optical monitoring systems (or interrogator or processing units) 12 include the Future Fibre Technologies FFT Secure Pipe product and the Optasense Pipeline Monitoring system. Also included are acoustic fibre optic interrogators from other manufacturers, such as Fotech and Hawk With these systems, a simple optical fibre cable can be laid along the conveyor belt and affixed near each roller. FIG. 2 illustrates a photograph of one such arrangement 20 wherein a cable 21 was affixed to a conveyor belt infrastructure 22 using cable ties 23, 24 or the like. Alternative fixing arrangements include spring or screw clamps.

The interrogator unit collects responses from the glass fibre light pulses. The glass fibre contains microscopic imperfections which scatter the light. The imperfections cause "Rayleigh Scattering", the same effect that renders the sky blue. Vibrations and temperature variations in the fibre cause refractive index changes inducing readable signals into the reflected light. High intensity, short pulse lasers are used, coupled with sensitive reflection detectors and fast analogue-to-digital converters.

The fibre is attached to an interrogator unit (or optical monitoring system or processing units) 12 from one of the proprietary companies discussed above, and outputs a digital equivalent of the received acoustic signal for storage. The acoustic signal is output in a data format as follows. For the output time period, an acoustic signal for each channel or unit distance along the conveyor, is output for each audio frequency received.

Figure 3:
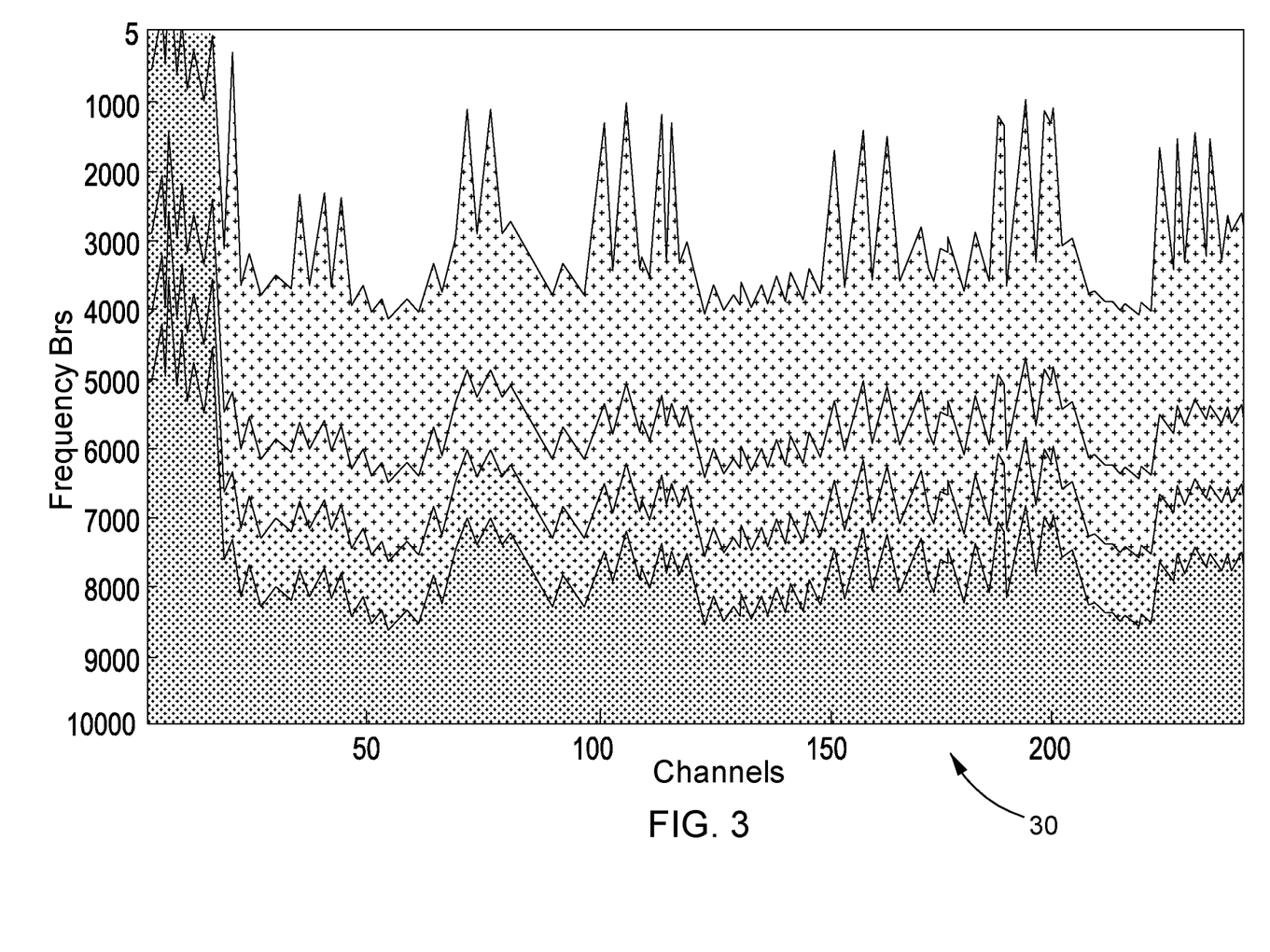
FIG. 3 illustrates an example 'waterfall' plot as received by an interrogator unit.

One form of representation of each unit time of data is known as a waterfall plot, an example of which is illustrated 30 in FIG. 3. The interrogator unit outputs equivalent data for waterfall plots at a predetermined rate. For example, 20,000 times per second (20 kHz).

The captured data must undergo significant processing before it can be utilised to effectively derive information on the state of the conveyor belt system.

In an embodiment, the output data was processed with the following sequence of operations in order to derive significant detail on the conveyor belt operations. The following list is the series of operations in the order in which they are programmed:

1. Selection of the length of time over which raw data are collected
2. Conversion of raw data to the standard HDF5 data format or other data format suitable for processing
3. Separation of the data in each channel to separate time series
4. Setting of the high pass, or other type of filter time constant
5. Application of a high pass or other type of filter to the time-series data sets
6. Setting of the Fourier Transform parameters to determine frequency range and resolution
7. Splitting the input data set into manageable file sizes of about 3 seconds' worth so as not to exceed a manageable number of samples, typically but not restricted to 65,536 samples.

8. Application of a fast Fourier Transform operation to extract frequency responses
9. Averaging filter to combine all the short files into 5 minutes' or 10 minutes worth or longer as required.
10. For each long averaged frequency plot regression of the lower noise floor envelope to a multiple order polynomial equation or other function such as an exponential, logarithmic, linear, piecewise linear or piecewise curved or other type of suitable function.
11. Subtract the regression equation curve from the frequency plot to normalise it.
12. Plot the frequency curve for each channel for visual inspection if required.
13. Supply the belt speed and roller diameter to calculate the fundamental roller frequency.
14. Select the fixed parameters of a Gaussian curve equation or some other pattern matching curve
15. Generate the equation of the pattern matching curve with adjustable centre frequency
16. Select the maximum frequency and the frequency interval to be used in the cross correlation
17. Cross correlate the pattern matching curve in the frequency domain with the frequency spectral plot for each channel. Thus generate a very high resolution averaged cross correlation plot for each channel
18. Use the high resolution plot to accurately identify the roller fundamental frequency and all its harmonics up to about 200 Hz or higher if required. Measure the centre frequency and height of each matched pattern.
19. Use the pattern matching curve equation and the known harmonic centre frequency and amplitude to re-create a coarse mathematical model plot of just the fundamental and its harmonics.
20. Use this model plot to generate a simple quality metric for fundamental harmonics condition of the belt.
21. Subtract the coarse mathematical harmonics model plot from the channel normalised frequency spectral plot.
22. Use the subtracted frequency plot up to 100 Hz to generate a simple quality metric of the roller bearing spalling frequencies in order to assess early stage bearing wear condition.
23. Record the fundamental harmonics condition and the bearing spalling wear frequency condition on a reporting spreadsheet, one row for each channel. Initially, the frequency plot is examined in the 100 Hz to 300 Hz range to identify the bearing condition in terms of mid-life failure. Then a review of the frequencies above 300 Hz is determined to identify later stage and end-of-life failure. The additional steps are to match (1) knocking frequencies below the fundamental, (2) rattling frequencies above 100 Hz, (3) squeak frequencies above 150 Hz and haystack plots at any frequency above 100 Hz. The results are saved as a csv file for future processing.
24. Combine channel reports from the spreadsheet into lines and numbers or idler frame numbers for the conveyor belt and publish as a new spreadsheet.

Detailed Description of the Data Processing Steps

There will now be described in more detail, the data processing steps listed above.
1. Selection of the length of time over which raw data are collected.
Normally other vibration data are collected from fibre optic cables for short time periods only, in the order of milliseconds or seconds. There are varied reasons for this mainly arising from the normal use of fibre optical vibration sensing as used in seismic work, intrusion detection and the like. These other uses of fibre optic vibration sensing are normally looking for seismic vibration events.

In the embodiment, a long term acoustic rather than short term vibrational signal is collected. The embodiments seek to operate on more or less continuous acoustic frequencies, not vibration events. Unfortunately, the marker frequencies of interest are likely to also be buried in significant noise. In order to extract the marker frequencies from the noise and to improve the signal-to-noise ratio for useful frequency identification, a data collection time of several minutes is best utilised.

Under ideal conditions a collection time of 5 minutes was found to be suitable. Under less-than-ideal conditions were high levels of noise are present, the collection time can extended to 10 minutes or longer. If the sampling frequency is 20 kHz, the number of samples collected is about a minimum of 6,000,000 for 5 minutes' worth. In the embodiment, a range of data collection times and sampling frequencies are used depending on the application, such as the length of the conveyor and other factors.

2. Conversion of raw data to a suitable data format for further processing

The FFT and Optasense interrogator products store their data in proprietary formats. As a first step to aid further processing the raw data collected by these instruments is the conversion of this data to an open standard format. Each brand of interrogator unit was found to have its own data format, and it is necessary to transfer this data into a standard data format. One form, but not the only form, of suitable format was found to be the HDF5 data file format.

3. Separation of the data in each channel to separate time series

The HDF5 or other data format file can then be partitioned into a separate file for each channel, also known as a "distance bin". A channel is a discrete length of fibre that effectively acts as an individual microphone. Channel length can be set in the interrogator and it is usually set at the most sensitive discrimination—at present around 1 metre or less. The partitioning is a first step so that the preliminary filtering is done on each individual channel. Depending on the way the system is set up, this operation can occur at any time before a subsequent Fourier Transform.

Using an appropriate scripting code, such as Matlab script code for prototyping, the data can be formatted appropriately from the proprietary format. Future software may be in any other programming language.

4. Setting of the pre-processing filter type and its time constant and drift removal The raw time-series data files as stored in HDF5 or other suitable data format are first filtered in order to modify the frequency response. The frequency response is modified differently according to the type of data collected and the specific interrogator used. Any type of filter may be used including, but not restricted to, high pass, low pass, band pass, band rejection, integration, differentiation, moving window and ARMA (auto-regressive moving average) filters. It was found in practice, that each proprietary data type and each interrogator biased the frequency response in its own way as follows:

OptaSense data type 1: single pulse technology: Data from this source was found to have a high DC component (at zero frequency) and a strong bias towards the lower frequencies with a very high roll-off as the frequencies rise above 50 to 100 Hz. As a result, a high pass filter is required to suppress the low frequencies and amplify the frequencies above about 100 Hz. In general, the filter time constant is set at a value of about 2000.

OptaSense data type 6: dual pulse technology: Data from this source was found to have a much flatter frequency response than data type 1 and is relatively consistent up to several kilohertz. The theoretical upper limit is about 10 kHz but frequencies above 1 kHz are rarely seen, with occasional frequency spikes in the 2 to 3 kHz region. The raw data was found to have a very heavy drift downwards towards the negative. It was stored as a 32-bit integer and so when the value reaches −32767 it immediately jumps to +32768, a process denoted "integer roll-over". The drift and the integer rollover represented significant problems. The solution was to use a differentiation filter on the raw time-series signal. The resulting integer roll-over spikes can then be simply deleted from the data.

Future Fibre Technology (F type) data: single pulse technology: Data from this source was found to be is similar to the data from data type 1 except that the frequency response was higher at the higher frequencies. Accordingly, it was found that it was not necessary to suppress the lower frequencies so much and a lower time constant was chosen. Currently, the time constant is set at 1000 but this can be adjusted if required.

5. Application of a frequency modification filter to the time-series data sets

Whilst there are many filters that can be used, an example filter was a first order high pass filter. A typical simple filter used experimentally was a first order high pass filter that suppresses low frequencies and amplifies the frequencies above the "knee" of the frequency response. The transfer function of such a filter is analogous to:

$$H(s) = \frac{RCs}{RCs + 1}$$

where the constant RC is formed from the resistance in ohms and the capacitance in farads if the filter is an analogue one constructed from an operational amplifier, a resistor and a capacitor. If the transfer function is changed to the following equation below, it can be modelled using the "digitally simulated analogue" method © Paul Wilson. The digitally simulated analogue method consists of a conversion of a transfer function into an analogue computer programme. The analogue computer programme is then simulated digitally in a digitally computer programme element by element. The technique was first described by Paul Wilson in his master's thesis in 1986 and he retains copyright. The method can be used for any type of analogue filter or any other analogue process.

$$H(s) = \frac{s}{s + \frac{1}{RC}}$$

Figure 4:
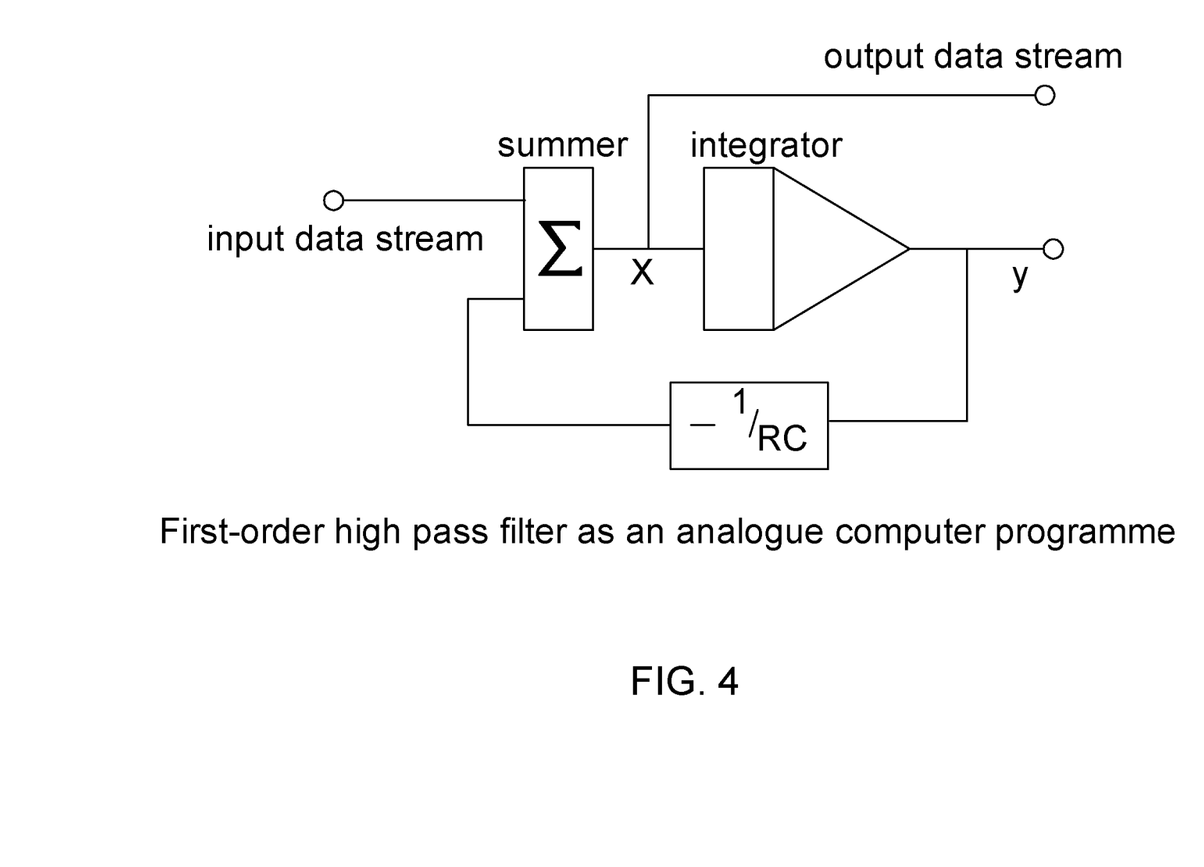
FIG. 4 illustrates one form of high pass filter.

The time constant of the filter=RC: the higher the value, the slower the filter. The filter can be modelled as an analogue form, as illustrated in FIG. 4. The conversion of the analogue computer programme into a digital form of this programme (written in C pseudocode) can be as follows:

```
// initialise the state variables
   Xnew = 0; Xold = 0;
   Ynew = 0; Yold = 0;
// loop through the input data set
   for (i=0;i<limit;i++)
   {
      Xnew = input_stream − RC*Ynew;   // summation
      Ynew = Yold + (Xnew + Xold) /2;   // trapezoidal integrator
      output_stream = Xnew;             // X goes to the output
      Xold = Xnew; Yold = Ynew;         // catch up state variable histories
      returns(output_stream);           // send to output
   }
```

Filtering data type 6 and other interrogators: The filtering for data type 6 was found to be of a different form and requires a different pre-processing filter. Each interrogator manufactured by different suppliers modifies the frequency dynamics in a different way which requires a different type of pre-processing filter tailored to the interrogator.

The end result of the pre-transformation part of the process is a modified frequency response plot which becomes apparent after it has been transformed. If the input data time series is differentiated it does not affect the frequency response except to remove the extremely low frequency component—the DC component. Differentiation filtering of an incoming analogue signal only shifts the phase of every frequency by +90 degrees but does not alter the frequencies. Since the input signal is a digital time series in place of an analogue one, the cut-off frequency is the reciprocal of the time over which the data are sampled. In one example, sampling for a period of 3 seconds at 20 kHz was conducted and so the differentiator cuts out the DC component below ⅓ Hz or 0.333 Hz.

This ideal was utilised for data type 6 as it removes the troublesome drift but still retains the frequencies of value which were found to be generally of 5 Hz and upwards. Therefore a straight differentiation of the digital input data stream replaces the high pass filter. Depending on the way the interrogator captures the data, any type of filter can be used 7. Setting of the Fourier Transform parameters In order to determine frequency range and frequency resolution required for further analysis it is necessary to select the correct parameters for a Fourier Transform operation. The equations governing the selection of parameters are known. The key equations are as follows:

$$T = N \cdot \Delta t^{secs}$$

$$F_{max} = \frac{N}{2} \cdot \Delta f^{Hz}$$

$$\Delta t = \frac{1}{2 \cdot F_{max}} \; secs$$

$$\Delta f = \frac{1}{T} \; Hz$$

where T=time over which samples are collected; N=number of samples in a collection; Δt=the sampling interval (time between adjacent samples); Fmax=is the maximum frequency observable; and Δf=Resolution of the frequencies (smallest frequency that can be discriminated).

Thus it is possible to decide the sampling interval and time over which sampling occurs in order to determine the other observable factors. The settings depend on choices affecting the particular conveyor, the application, the conveyor owner's requirements, conveyor length and other factors.

The Fourier Transform is a powerful tool but it can also be subject to artefacts both from the data and from mirroring and end effects so care must be taken to exclude such artefacts and to extract reliable results. To this end, the data was processed in time slices of 65536 time series samples. In order, then to remove end effects such as wrap-around, this is cut down to 32768 samples after processing. At a sampling frequency of 20,000 Hz, the resulting time slices were about 3 seconds.

The sampling frequency of 20,000 can be adjusted at the interrogator, primarily to cover a greater distance along the fibre. It is therefore a trade off of maximum observable frequency against covering more conveyor length in a single measurement. In practice the sampling frequency is adjusted by the interrogator settings, but the value is decided in accordance with the application, the conveyor and the requirements of its owner.

7. Splitting the Saved Data File (HDF5 or Other) into Manageable File Sizes of about 3 Seconds' Worth In order to meet the requirements of the Fourier transform equations above, the sample for each channel of 5 minutes or 10 minutes of data is now split into shorter slices (in time). At a sampling frequency of 20 kHz, this becomes about 100 time slices of 3 seconds each. This gives 65536 time series samples in each time slice. Each of these can now be processed to generate a Fourier Transform. At other sampling frequencies, the number of samples required for processing defines the duration of each time slice and the number of time slices.

8. Application of a Fast Fourier Transform Operation

Each 3 second time slice of data is processed using a modern Fast Fourier Transform algorithm (experimentally Matlab was used but one of several maths library functions such as GSL can be used). Other types of discrete or fast Fourier Transform algorithms could be used and are included as an option here. Thus for each 3 second time slice and for one channel of fibre (about 1 metre length) one obtains 100 to 200 Fourier transform plots in the form of a data set or list of values. Next, the top half of the data set is removed to remove the mirroring wrap-around effect, bringing the data set down to 32768 samples.

9. Averaging Filter to Improve the Signal to Noise Ratio

In most cases, a few seconds of data was found to be insufficient. It was found that the signal-to-noise ratio was often so poor that it was very difficult to obtain any meaningful analysis from a frequency plot covering less than a few minutes' of data.

The Fourier transform has already done a partial job in extracting useful spectral signatures but they are likely to be buried in noise. In order to take advantage of the extended time period (5 minutes or longer) of data collection, the hundreds of frequency plots for each channel are averaged or summed and the frequency peaks needed are amplified and the noise is suppressed by averaging out. This also removes spurious occasional noise such as passing vehicles or something impacting the conveyor frame.

10. Noise Floor Removal

The frequency plot obtained following the averaging filter operation was found to still exhibit artefacts that interfere with analysis of the results, especially any form of automated analysis. The base level of noise was found to vary considerably from channel to channel depending on the spurious environmental noise and acoustic resonances in the frame and surrounding equipment. The design of the conveyor frame and external environment can have considerable impact on the noise level if, for example, the conveyor crosses a creek bridge.

The noise floor was found to frequently rise sharply at the low end of the spectrum due to a lot of low rumble contamination, caused by steelwork resonances and other factors, and sometimes a DC component, although the pre-processing filter may remove much of this. The low end rise in the plot should be removed. However where there is a sharp rise in the noise floor over a small frequency range at higher frequencies (usually above 200 Hz) this should be retained as is an important marker for late stage bearing wear. The noise floor shape does not necessarily follow a mathematical analytic curve described by a single equation, and is different for each frequency plot.

The noise floor removal process can proceed as follows. Identifying the envelope running along the underside of the plot joining all the lower spikes. To this envelope, a curve is fitted. Several different envelope curves have been used and recently a 5th order polynomial equation, an exponential or logarithmic curve, a piecewise linear curve and piecewise conglomeration of several curves have all been used. The library incorporates a variety of envelope equations including all of the aforementioned and others. The envelope curve is currently found using a standard maths packages or maths software library (Matlab, Octave, Gnu Scientific Library or GSL). The fifth order polynomial fit and the exponential fit were found to be best for mapping the noise floor on certain types of data sets without fitting (and hence removing) too closely the required, important, late stage wear markers. The selection of a library of suitable envelope equations will depend, in future, on the application parameters and requirements. The envelope curve is then subtracted from the 5 minute (or 10 minute or greater) frequency plot for each channel. Normalising each channel is an essential step in order to automate the pattern analysis process.

12. Storage of Normalised Frequency Plots

At this point in the procedure the entire set of frequency plots, one for each channel (or distance slot) is stored for further analysis and manual inspection if required.

Preparation for Automated Analysis and Pattern Recognition

The very volume of processed frequency plots is such as to render manual interpretation difficult. Fully automated plot analysis is therefore important. The steps that follow are part of the ongoing development of fully automated pattern recognition and fault diagnosis.

There are six main patterns to be resolved from the frequency plots and these are:

1. The fundamental frequency of rotation of the rollers and its harmonic frequencies, 2nd, 3rd, 4th, 5th and higher harmonics. If the fundamental frequency is 10 Hz (typical) then harmonic frequencies occur at 20, 30, 40, 50, 60, 70 and so on sometimes as high as 150 Hz
2. Spalling frequencies which represent early stage wear on bearing surfaces such as the ball surfaces and race surfaces. Also included are cracks in the ball cage. These frequencies can be calculated and generally occur below 100 Hz.
3. Mid-life wear patterns represented by what is called a "haystack" plot as it resembles a disorganised mediaeval stack of hay. The haystack is a collection of rattle frequencies caused by looseness in the ball races as they wear and start to rattle. These frequencies are generally seen from about 50 Hz up to about 200 to 250 Hz.
4. Late-stage wear patterns are seen as haystack plots in the higher frequencies. They generally occur above 250 Hz, frequently occur in the 400 Hz to 800 Hz range and sometimes can be seen as high as 4000 Hz. These haystack plots are typical of bearings that are seized and require immediate replacement. Frequently there are more than one haystack plot in the frequency range.

5. Knocking wear patterns. Knocking is a large frequency spike below the fundamental frequency indicating a very loose or collapsing bearing.
6. Squeaking: Squeaking is a single frequency spike in the range above 150 Hz indicating a seized ball or ball cage.

Figure 5:
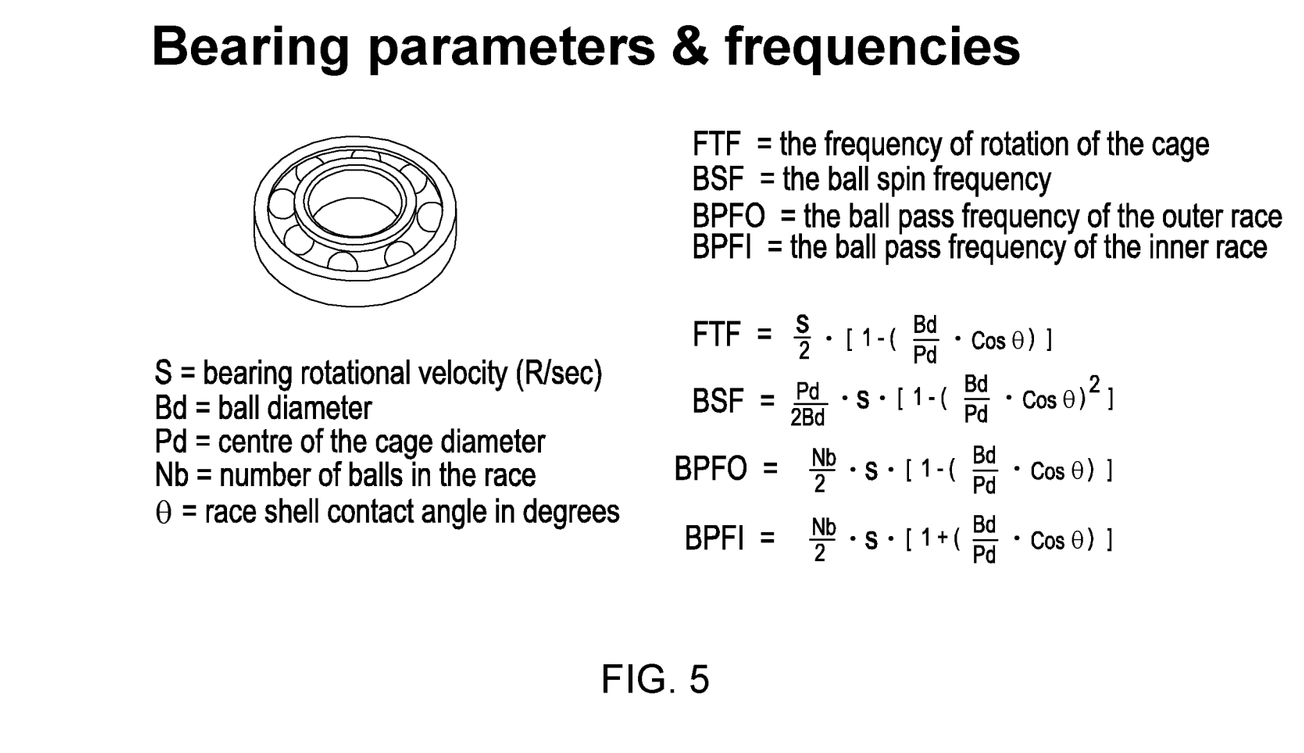
FIG. 5 illustrates the bearing frequency calculation equations.

Spalling frequency calculations: The frequency markers for spalling frequencies are known and also haystack plots are widely discussed in the literature and commercial advice notes. The present embodiment allows them to be extracted from the fibre optic cable sampling technology. The frequencies and equations are provided in FIG. 5.

Figure 6:
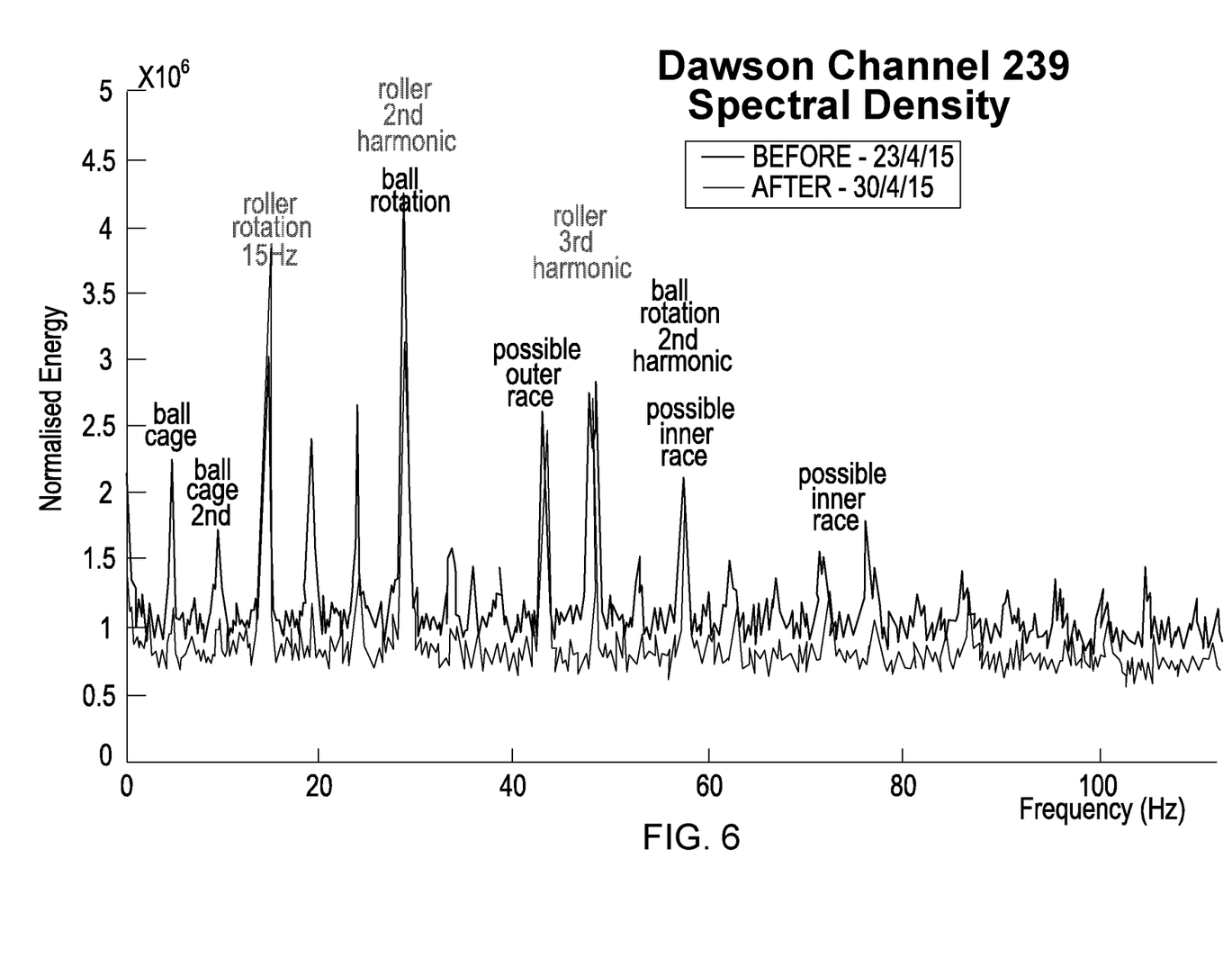
FIG. 6 illustrates a plot of frequencies of operation in an example conveyor belt system.
Figure 7:
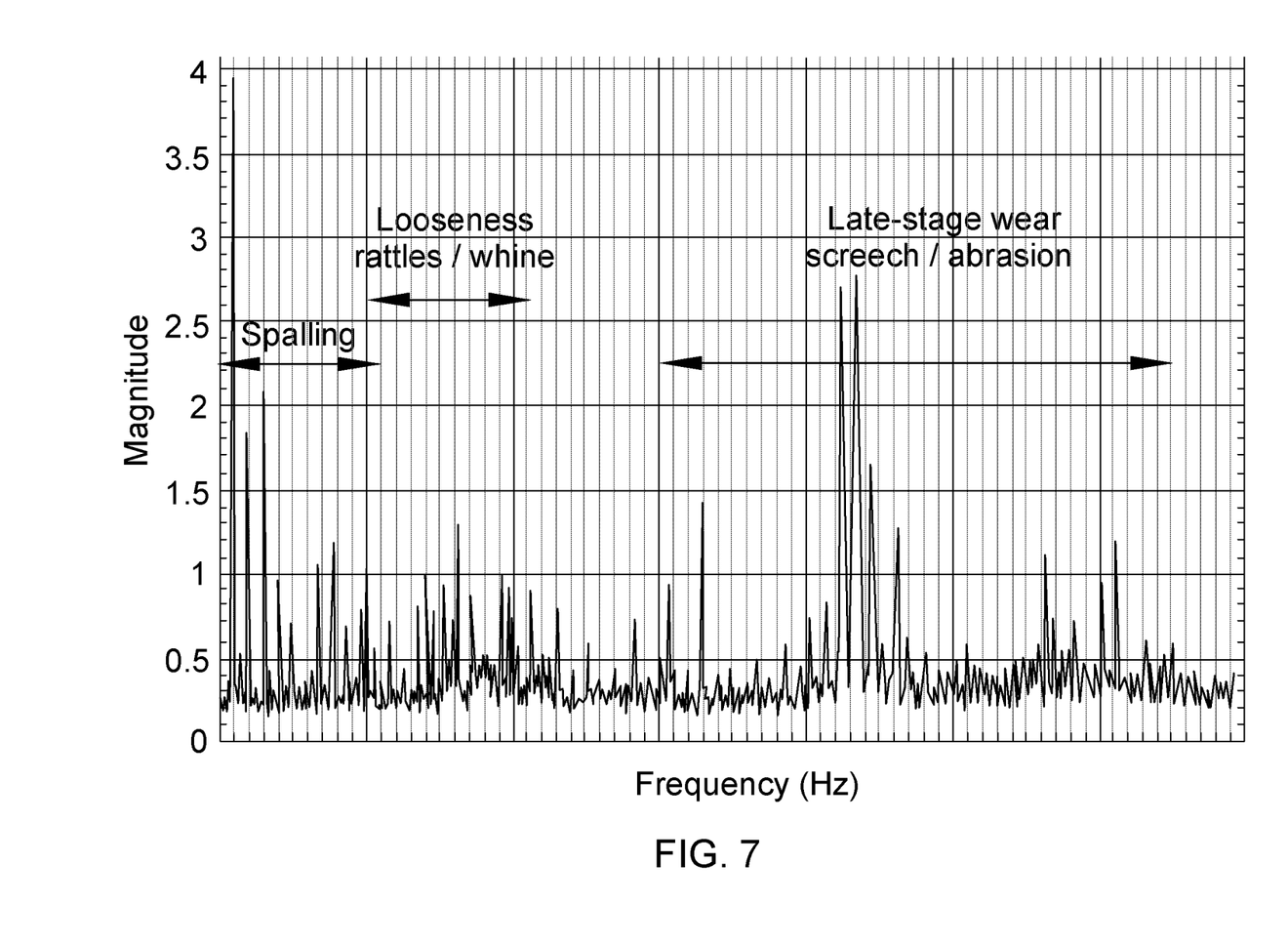
FIG. 7 illustrates a plot of different operational characteristics of bearings.

FIG. 6 illustrates the spall frequencies. FIG. 7 illustrates a general range of marker frequencies.

Known frequency inputs: In order to trigger the calculations regarding the fundamental frequency and its harmonics, it is necessary to set in the fundamental frequency. It can be calculated from the belt speed and the roller diameter.

14. Select the fixed parameters of a Gaussian curve equation or other envelope equation.

There are many frequency spike envelope equations that can be used including a Gaussian curve, triangular, rectangular, and any of the wavelet shapes. The shape of the fundamental frequency and its harmonics frequency peak closely resembles a Gaussian curve and this shape has been found to be effective for the purpose. The embodiment may make use of other envelope shapes. A Gaussian envelope can be generated from an exponential equation of the usual form:

$$y = a * e^{\left(-\frac{(x-b)^2}{2c^2}\right)}$$

The values of a, b and c are constant parameters. The value of "a" determines the height, the value of "b" determines the location of the centre point, and the value of "c" determines the steepness of the slope. The values of "b" and "c" are more or less constant for all of the harmonic peaks and can be set at fixed values. The value of "a" varies depending on the usage. For the cross-correlation procedure below, the value of "a" is a nominal value (say, 1). When the full model is created, the value of "a" is the height of the peak being modelled.

15. Set Up the Frequency Peak Envelope Curve Equation for the Cross-Correlation

A cross-correlation procedure is used in the frequency domain to correlate the frequency spectrum with the frequency peak envelope. Normally, cross-correlation is used for time-series data in the time domain so this is an unusual usage. The purpose is to find locations where the frequency plot matches Gaussian-shaped peaks and so identify the fundamental frequency and its harmonics. The important aspect of the cross-correlation process here is that it renders a softer, filtered-looking plot with considerably higher frequency precision than the original frequency plot. The resolution is somewhat arbitrarily set at 100 times greater than the resolution of of the original frequency plot derived from the Fourier transform. The resolution magnification factor is a parameter to be selected in an operational embodiment.

The higher resolution plot permits the more precise identification of the location of the frequency peaks ready for modelling. Thus, at this point, the cross-correlation parameters, a, b, c and the resolution are defined. The resolution is defined by the incremental movement of the frequency peak envelope curve as it passes across the frequency plot—how small a movement is made between each successive step.

Another decision made at this point is the maximum frequency of interest. It can be any value but experience has shown that the harmonics tend to peter out at around 150 Hz to 300 Hz, so there is little value in proceeding past that. Each conveyor has been found to have its own range of harmonic frequencies and the upper value must be set for the conveyor during commissioning.

17. Cross-Correlate the Frequency Peak Envelope Curve with the Frequency Plot

The cross-correlation is carried out by passing the frequency peak envelope curve across the frequency plot in one direction. Generally, it would be from left to right, from the low frequencies to the high frequencies but it can be in the opposite direction. The passing of the curve from left to right can be in very small increments. Because the resolution of the basic frequency plot is considerably higher than the correlation increments, at each incremental step, the frequency peak envelope model must be re-calculated at the coarse resolution and if plotted it looks step-wise spikey.

The recalculation procedure is as follows: Let F(f) be the frequency plot data set. Let G(f) be the Gaussian curve plot in coarse resolution at one specific fine resolution location. Let Y be the resulting correlated value at a single step. Let C(ff) be the resulting fine resolution cross-correlation plot:

for $ff = 0$ to $60{,}000$ do:

$$Y = \sum_{\substack{i=0 \\ 200\ Hz \\ i=600}}^{0\ Hz} (F(i) * G(i))$$

then $C(ff)$ is the resulting plot of $Y$ from 0 to 60,000

18. Accurately Identify the Fundamental Frequency and Harmonics.

Now that there is a high resolution frequency plot with suppressed noise, the Gaussian peaks are amplified. The location of the fundamental has already been calculated and so that location is determined and accurate measurement of the maximum point is determined, thus giving a very accurate fundamental frequency. The harmonics will be integer multiples of this value and are then visited as a check. The maximum point of each harmonic peak is measured accurately and a list is made of all the harmonics and their amplitudes.

19. Re-Model the Fundamental and Harmonics in Coarse Resolution

Using the list of harmonics and an accurate location of each peak, the locations are used to determine the value of "a" in the Gaussian equation for each of the harmonics. The next step is to re-constitute a coarse-grained model of just the fundamental and its harmonics in the original frequency plot resolution. This plot is devoid of other signals such as spalling frequencies and haystack plots.

20. Use the Fundamental and Harmonics Model to Generate a Report of Just the Harmonics Content in the Data.

The fundamental and its harmonics model (either coarse or fine grained) are then used to create a somewhat subjective metric of the roller condition. This metric gives an indication of the belt flapping against rollers, any out-of round roller condition and any material adhering to the rollers. The metric is added to a report of belt condition which could be as a column in a spreadsheet.

21. Subtraction of the Fundamental—Harmonic Model from the Frequency Plot

The coarse-grained fundamental and harmonics frequency plot model is now subtracted from the original coarse-grained frequency plot. This removes the fundamental and harmonics leaving behind the other spectral signatures of interest, specifically the spalling frequency patterns, the 100 to 200 Hz rattle and looseness haystacks, the knocking frequencies below the fundamental, the squeaking frequencies above 200 Hz and the late-stage wear or seizure haystack plots above 200 Hz.

22. Generate a Spalling Failure Metric from the New (Subtracted) Plot

The new subtracted frequency plot, devoid of the fundamental and harmonics is used to examine and measure peaks below 100 Hz. An averaged metric is generated to give an overall assessment of the state of wear of the bearing surfaces. This metric is added to the report for each channel.

23. Generate a Haystack Failure Metric from the New (Subtracted) Plot

The new subtracted frequency plot, devoid of the fundamental and harmonics is used to examine and measure any haystack plots above 100 Hz. A haystack or a series of spikes between 100 Hz and 200 Hz generally indicates whine or rattle in the bearings and indicates mid-life failure. Haystack plots above 200 Hz are indicative of late-stage failure or bearing seizure. Averaged metrics are generated to give overall assessments of the state of wear of the bearings. The metrics are added to the report for each channel.

In summary, the embodiments provide a system and method for the automated sensing of equipment and systems such as conveyor belt systems using a simple fibre optic sensing arrangement. This has significant potential to provide a low cost effective monitoring system, and can be applied for the simultaneous sensing of machine wear in a multitude of environments, Interpretation Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may do so. Furthermore, the particular features, structures or characteristics may be combined in any suitable manner, as would be apparent to one of ordinary skill in the art from this disclosure, in one or more embodiments. During several trials using different interrogators on different conveyors all of these methods have been used in a range of different configurations or embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practised without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulae given above are merely representative of procedures that may be used. Functionality may be added or deleted from the block diagrams and operations may be interchanged among functional blocks. Steps may be added or deleted to methods described within the scope of the present invention.

The invention claimed is:

1. A method of measuring the state or condition of a plurality of spatially spaced apart machine parts subject to wear and emitting an acoustic signature, the method including the steps of:
    (a) optically sensing acoustic properties of the plurality of spatially spaced apart machine parts subject to wear, and deriving sensed signals there from,
    (b) dividing the sensed signals into a first series of corresponding spatial segments along the plurality of spaced apart machine parts and, for each spatial segment, dividing the sensed signal into a temporal segment recording the acoustic properties for the spatial segment over an extended time period;
    (c) dividing each temporal segment into a series of sub-segments and frequency domain transforming the sub-segments into corresponding frequency domain sub-segments;
    (d) combining the frequency domain sub-segments within a spatial segment, to produce a corresponding lower noise level combined frequency domain sub segment;
    (e) determining a fundamental operating frequency of at least one of the machine parts from the emitted acoustic signature from the combined frequency domain sub segment, and determining the associated harmonics of the fundamental frequency;
    (f) removing the fundamental frequency and associated harmonics from the combined frequency domain sub-segment to produce a modified combined frequency domain sub segment; and
    (g) determining, from the modified combined frequency domain sub segment for a spatial segment, a measure of the state or condition of a corresponding machine part the measure including at least one of:
        (i) the magnitude of frequency spikes in the modified combined frequency domain sub segment below 100 hz and not one of the fundamental frequency or harmonic frequencies, indicating the state of wear of machine part surfaces;
        (ii) the magnitude of a series of any frequency spikes between 50 hz and 250 hz, in the modified combined frequency domain sub segment and not a fundamental frequency or harmonic frequency, indicative of mid-life machine part wear; or
        (iii) the magnitude of any series of frequency spikes in the modified combined frequency domain sub segment above 250 hz, and not a fundamental or harmonic frequency, indicative of late stage machine part wear.

2. A method as claimed in claim 1 wherein said machine parts include bearings.

3. A method as claimed in claim 1 wherein said machine parts form part of a conveyor belt.

4. A method as claimed in claim 1 wherein said optical sensing occurs substantially simultaneously for the acoustic properties of the plurality of machine parts.

5. A method as claimed in claim 1 wherein said step (d) further includes, subtracting a noise floor measure from the combined frequency domain sub segment.

6. A method as claimed in claim 5 wherein said noise floor measure includes an interpolated curve through substantially a lower noise floor level of the combined frequency domain sub segment.

7. A method as claimed in claim 6 wherein said interpolated curve includes one of a polynomial, exponential, logarithmic or piece wise segment curve.

8. A method as claimed in claim 1 wherein said optical sensing includes utilising a scattering along an optical fiber to sense said acoustic properties.

9. A method as claimed in claim 1 wherein said step (a) further includes filtering the sensed signals to account for frequency based attenuation characteristics of the optical sensing.

10. A method as claimed in claim 1 wherein said step (e) includes the step of convolving a Gaussian shaped structure with the combined frequency domain sub segment.

11. A method as claimed in claim 1 wherein said temporal segments are from two to ten minutes long.

12. A method as claimed in claim 1 wherein said sub-segments are approximately 3 seconds long.

13. A method as claimed in claim 1 wherein said temporal segments are at least two minutes long.

14. A method of measuring the state or condition of a conveyor belt system, the conveyor belt system including a plurality of roller units each having a series of ball bearings, the method including the steps of:
    (a) optically sensing acoustic properties of the conveyor belt system along its length, and deriving sensed signals there from,
    (b) dividing the sensed signals into a first series of spatial segments along the conveyor belt and for each spatial segment, dividing the sensed signals into a temporal segment recording acoustic properties for the spatial segment over an extended time period;
    (c) dividing each temporal segment into a series of sub-segments and frequency domain transforming the sub-segments into corresponding frequency domain sub-segments;
    (d) combining the frequency domain sub-segments within a spatial segment, to produce a corresponding lower noise level combined frequency domain sub segment;
    (e) determining a fundamental operation frequency of rotation of any rollers present in the combined frequency domain sub segment, and associated harmonics;
    (f) subtracting a model of the fundamental frequency of rotation and harmonics from the combined frequency domain sub-segment to obtain a modified frequency domain sub-segment; and
    (g) analysing the modified frequency domain sub-segment to determine bearing wear conditions.

15. A method as claimed in claim 14 wherein said step (e) includes cross correlating the combined frequency domain sub segment with a Gaussian peak function.

16. A method as claimed in claim 14 wherein said step (d) includes averaging or summing frequency domain sub-segments.

17. A method as claimed in claim 14 wherein said step (d) includes regressing a noise floor within the frequency domain sub segment using a polynomial or exponential subtraction.

18. A method as claimed in claim 14, wherein bearing wear conditions include at least one of:
   bearing spalling frequencies, if any, bearing midlife wear patterns, or bearing late stage wear patterns, bearing haystack patterns.

19. A method as claimed in claim 1 wherein said spalling frequencies are below 100 Hz.

20. A method as claimed in claim 14 wherein said temporal segments are from two to ten minutes long.

21. A method as claimed in claim 18 wherein said sub-segments are approximately 3 seconds long.

22. A method as claimed in claim 14 wherein said temporal segments are at least two minutes long.

* * * * *